United States Patent
Liu (10) Patent No.: US 11,175,912 B2
(45) Date of Patent: Nov. 16, 2021

(54) VERSION MANAGEMENT SYSTEM, VERSION MANAGEMENT METHOD AND NON-TRANSITORY COMPUTER-READABLE MEDIUM

(71) Applicant: Wistron Corp., New Taipei (TW)

(72) Inventor: Wei-Hung Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 27 days.

(21) Appl. No.: 16/741,107

(22) Filed: Jan. 13, 2020

(65) Prior Publication Data

US 2021/0141638 A1 May 13, 2021

(30) Foreign Application Priority Data

Nov. 12, 2019 (TW) ................... 108140906

(51) Int. Cl.
G06F 9/44 (2018.01)
G06F 8/71 (2018.01)
G06F 11/36 (2006.01)

(52) U.S. Cl.
CPC .............. *G06F 8/71* (2013.01); *G06F 11/368* (2013.01); *G06F 11/3656* (2013.01)

(58) Field of Classification Search
CPC ....... G06F 8/71; G06F 11/3656; G06F 11/368
USPC .......................................................... 717/122
See application file for complete search history.

(56) References Cited

U.S. PATENT DOCUMENTS

| 10,671,373 | B1 * | 6/2020 | Walker ..................... G06F 8/71 |
| 2009/0249295 | A1 * | 10/2009 | Poole ..................... G06Q 10/06 717/120 |
| 2013/0091170 | A1 * | 4/2013 | Zhang ............... G06Q 10/06313 707/783 |
| 2016/0077809 | A1 * | 3/2016 | Heyhoe ..................... G06F 8/30 717/106 |
| 2018/0060065 | A1 * | 3/2018 | Lai ............................. G06F 8/71 |
| 2019/0026663 | A1 * | 1/2019 | Homeyer .......... G06Q 10/06316 |
| 2019/0042205 | A1 * | 2/2019 | Vesin ......................... G06F 8/71 |

(Continued)

FOREIGN PATENT DOCUMENTS

| CN | 101814026 A | 8/2010 |
| CN | 103593295 A | 2/2014 |

(Continued)

OTHER PUBLICATIONS

Git on the cloud in the classroom author: J Lawrance, published on 2013.*

(Continued)

*Primary Examiner* — Chameli Das
(74) *Attorney, Agent, or Firm* — McClure, Qualey & Rodack, LLP (57) ABSTRACT

A version management method includes the following steps: selecting a master branch; receiving bug information, wherein the bug information includes the bug state; and setting the bug state to a working state after receiving a confirmation assignment message corresponding to the bug information; in response to setting the bug state to the working state, generating a branch corresponding to the bug information based on the master branch, and merging modified code of the branch to a candidate branch; and in response to the release time arriving, merging the candidate branch to the master branch, and setting the bug state to a verification state.

15 Claims, 7 Drawing Sheets

(56) References Cited

U.S. PATENT DOCUMENTS

2019/0332365 A1* 10/2019 Naganuma ................ G06F 8/33
2020/0004519 A1*  1/2020 Ryall ........................ G06F 8/71
2020/0202006 A1*  6/2020 Shah ......................... G06F 8/71
2020/0257597 A1*  8/2020 Kolesnik ............. G06F 11/3624

FOREIGN PATENT DOCUMENTS

| CN | 105094851 A | 11/2015 |
| CN | 105630522 A |  6/2016 |
| CN | 106326110 A |  1/2017 |
| CN | 109784595 A |  5/2019 |

OTHER PUBLICATIONS

Modern version control: creating an efficient development ecosystem author: N Mertino published on 2012.*
Title: Using origin analysis to detect merging and splitting of source code entities, author: MW Godfrey, published on 2005.*
Title: Assessing the value of branches with what-if analysis ; author: C Bird, published on 2012.*
Chinese language office action dated Dec. 14, 2020, issued in application No. TW 108140906.
"Git branch management strategy;" Programming thinking (http://wangzhenkai.com); Nov. 2018; pp. 1-4.
English language translation of "Git branch management strategy".

* cited by examiner

VERSION MANAGEMENT SYSTEM, VERSION MANAGEMENT METHOD AND NON-TRANSITORY COMPUTER-READABLE MEDIUM

CROSS REFERENCE TO RELATED APPLICATIONS

This Application claims priority of Taiwan Patent Application No. 108140906, filed on Nov. 12, 2019, the entirety of which is incorporated by reference herein.

BACKGROUND OF THE INVENTION

Field of the Invention

The present disclosure relates to a management system and, in particular, to a version management system, a version management method, and a non-transitory computer-readable medium.

Description of the Related Art

In project management, a bug management system is usually used to track issues. When an issue is discovered, the issue itself can be tracked on the bug management system based on the phenomenon, recurrence, and severity of the problem, among other factors. Furthermore, each issue itself usually has a corresponding handle or an owner that can resolve the issue.

On the other hand, after the release the software, there will be situations in which the bugs must be dealt with, and cooperation with project management is required. When a problem is identified as a software problem, a software engineer is assigned to be the person in charge of dealing with the problem, and he begins to track the problem, understand the problem, and resolve the problem.

However, when an engineer is designated as the person in charge of handling the problem, the problem must be maintained in the bug management system for recording the current processing status. If the problem itself must be modified by code, the engineer needs to operate the version control for the modified code and the original code when modifying the code. After a solution is confirmed, the engineer merges the solution with the original code. Next, the engineer also needs to go back to the bug management system to modify the current processing status of the problem, so as to complete the process of fixing the bug. Throughout this process, the engineer must be responsible for manually updating the state of two different categories of systems, so it is prone to human error, especially since different categories of systems do not have synchronized updates.

Therefore, how to automatically update the bug state in a bug management system, reduce the occurrence of human error, and improve the efficiency of software version control is one of the problems in this field that needs solving.

BRIEF SUMMARY OF THE INVENTION

In accordance with one feature of the present invention, the present disclosure provides a version management system that includes a code version control system, a bug management system and an agent system. The code version control system is configured to select a master branch. The bug management system is configured to receive bug information. The bug information includes the bug state. The agent system is configured to set the bug state to a working state after receiving a confirmation assignment message corresponding to the bug information. In response to the agent system setting the bug state to a working state, the agent system controls the code version control system to generate a branch corresponding to the bug information based on the master branch, and the code version control system merges modified code of the branch to a candidate branch. In response to the release time arriving, the agent system controls the code version control system to merge the candidate branch to the master branch, and the agent system sets the bug state to a verification state.

In accordance with one feature of the present invention, the present disclosure provides a version management method. The version management method includes the following steps: selecting a master branch; receiving bug information; wherein the bug information includes the bug state; and setting the bug state to a working state after receiving a confirmation assignment message corresponding to the bug information; in response to setting the bug state to a working state, generating a branch corresponding to the bug information based on the master branch, and merging modified code of the branch to a candidate branch; and in response to the release time arriving, merging the candidate branch to the master branch, and setting the bug state to a verification state.

In accordance with one feature of the present invention, the present disclosure provides a non-transitory computer-readable medium. The non-transitory computer-readable medium for storing one or more computer programs including a plurality of instructions, having computer-executive instructions stored thereon that, when executed by a processor, cause a computer to implement a version management method, the method comprising: receiving bug information; wherein the bug information includes the bug state; and setting the bug state to a working state after receiving a confirmation assignment message corresponding to the bug information; in response to setting the bug state to a working state, generating a branch corresponding to the bug information based on a master branch, and merging modified code of the branch to a candidate branch; and in response to the release time arriving, merging the candidate branch to the master branch, and setting the bug state to a verification state.

The version management system, the version management method, and the non-transitory computer-readable medium shown in the embodiment of the present invention, wherein the code version control system and the bug management system can be connected through the agent system. The engineer (or the person in charge of the bug) can complete the bug status update of the bug management system by simply interacting with the agent system, and establish branching, debugging, and providing a corresponding solution. Since the bug management system is connected to the solution, the solution can be stored in the storage device. The engineer (or the person in charge of the bug) can obtain the corresponding executable software or complete code from the storage device by clicking the code link of the corresponding solution. Since the problem itself is also a result measured based on a solution, the software code of the reproducible problem can also be obtained by the agent system querying the storage device to look up the reference table. In addition, once the assigned engineer (or the person in charge of the bug) accepts to handle the bug, the agent system can automatically update the bug status of the corresponding problem on the bug management system and automatically generate one or more code branches corresponding to the bug for the engineer (or the person in charge of the bug) to debug and modify the source code. Furthermore, the agent system can control the code version control system to create a candidate branch for finding the solution according to the expected correction date (software release time) set by the bug management system. The candidate branch can be combined with one or more solution code. In this way, the solution corresponding to one or more bugs is integrated, so that the software version of the project can be better controlled, and the cost of regression testing of each tester is also saved. The code on the branch can be merged into the candidate branch once the corresponding solution is confirmed. When the release time arrives, the candidate branch is merged into the master branch, and the status in the bug management system is immediately updated by the agent system. This reduces the possibility of human error and increases the efficiency of software version control.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1A:
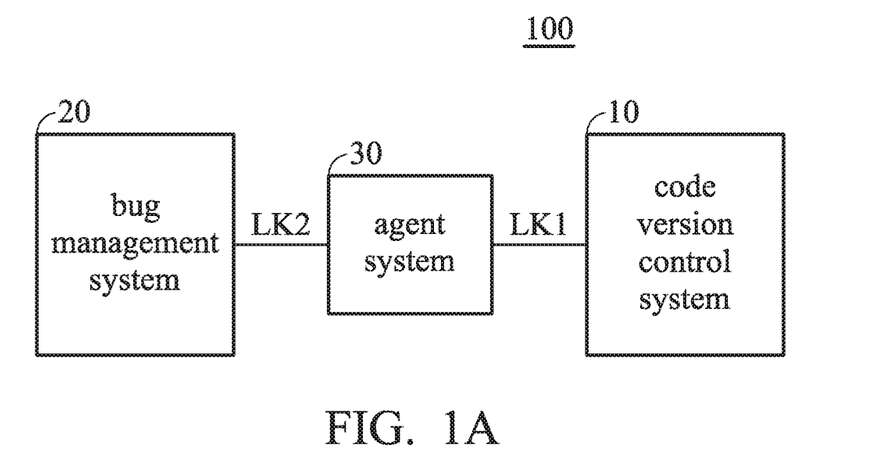
FIG. 1A is a block diagram of a version management system in accordance with one embodiment of the present disclosure.
Figure 1B:
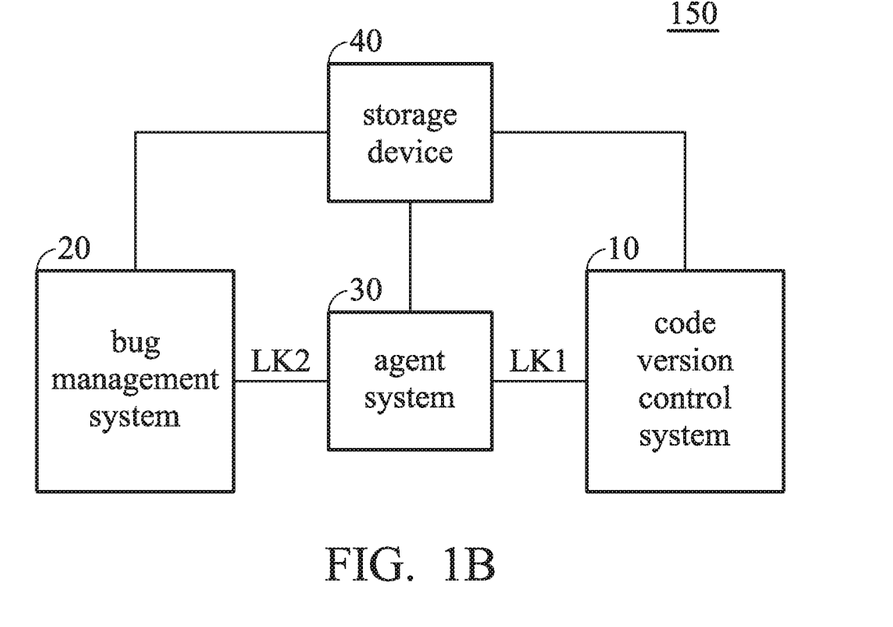
FIG. 1B is a block diagram of a version management system in accordance with one embodiment of the present disclosure.
Figure 1C:
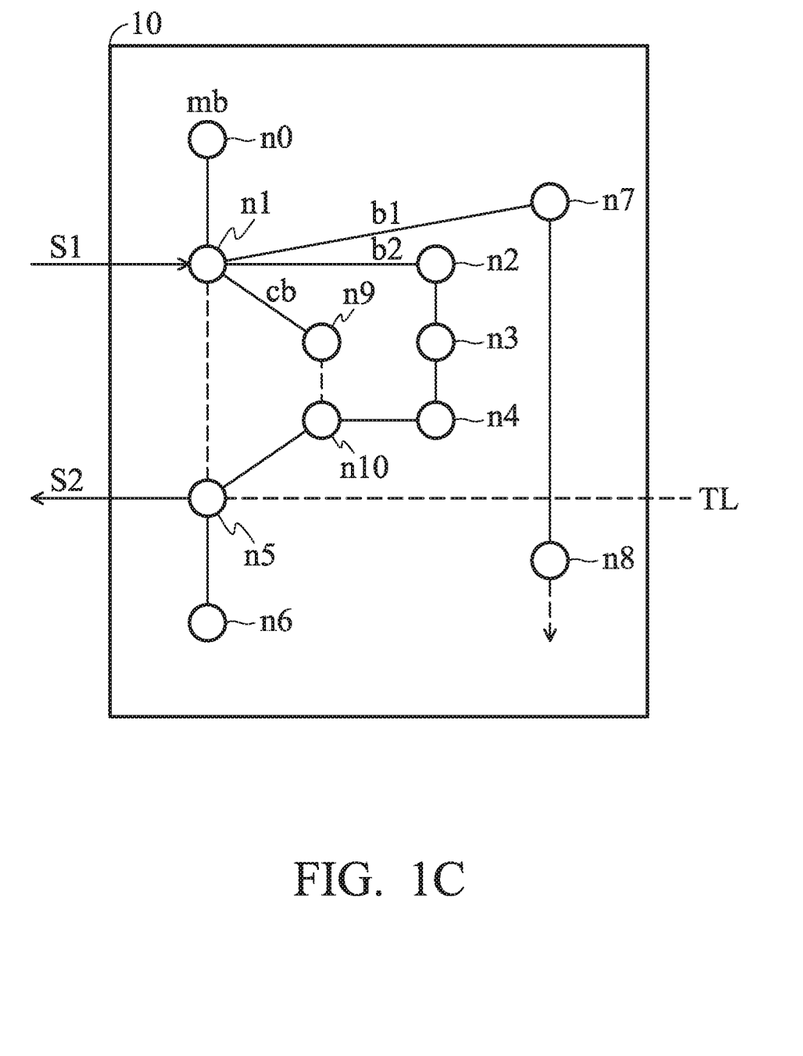
FIG. 1C is a schematic diagram of the operation of the code version control system 10 in accordance with one embodiment of the present disclosure.
Figure 2:
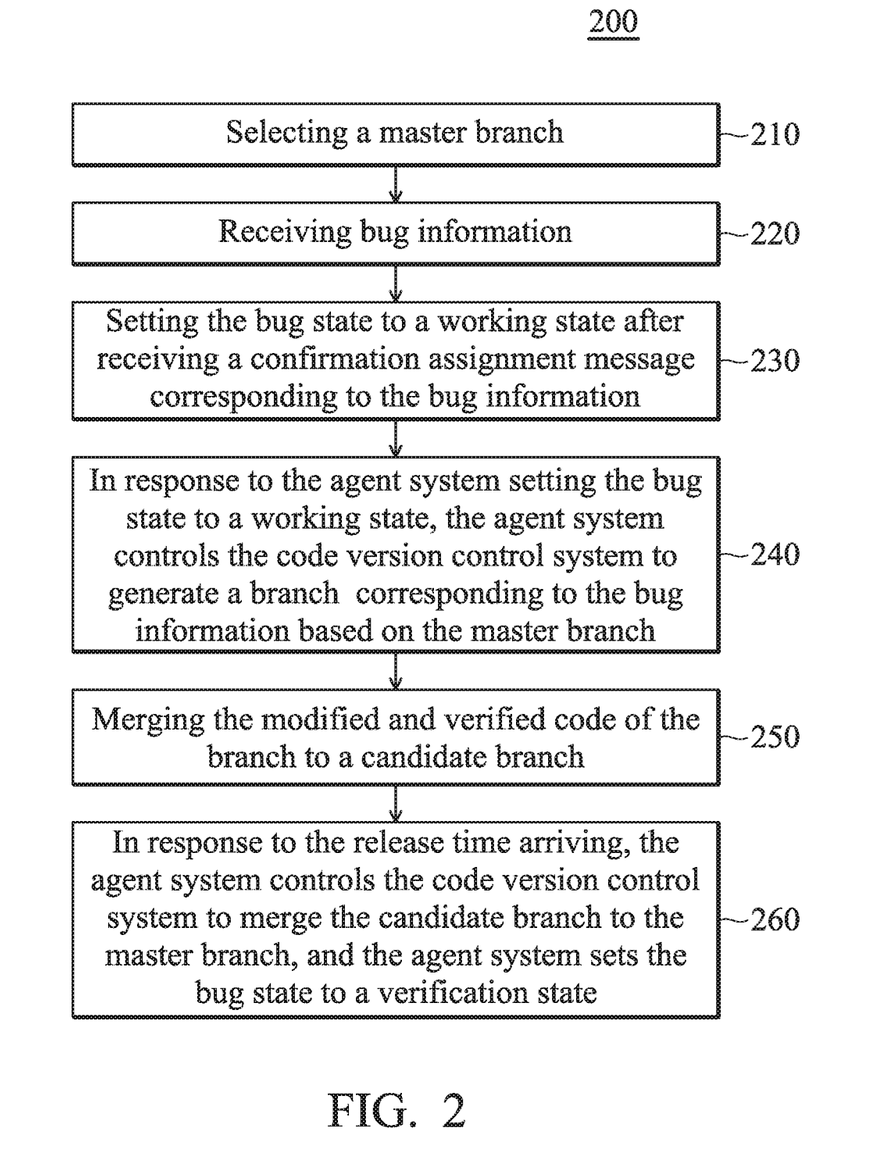
FIG. 2 is a flow chart of a version management method in accordance with one embodiment of the present disclosure.

Please refer to FIGS. 1A-1C and 2, FIG. 1A is a block diagram of a version management system 100 in accordance with one embodiment of the present disclosure. FIG. 1B is a block diagram of a version management system 150 in accordance with one embodiment of the present disclosure. FIG. 1C is a schematic diagram of the operation of the code version control system 10 in accordance with one embodiment of the present disclosure. FIG. 2 is a flow chart of a version management method 200 in accordance with one embodiment of the present disclosure.

In one embodiment, as shown in FIG. 1A, the version management system 100 includes a code version control system 10, a bug management system 20, and an agent system 30. The code version control system 10, the bug management system 20, and the agent system 30 can each be implemented in software, firmware, or an electronic device having computing ability, such as a computer. In one embodiment, the code version control system 10 and the agent system 30 have a communication link LK1 for transmitting messages, and the bug management system 20 and the agent system 30 have a communication link LK2 for transmitting message.

In one embodiment, as shown in FIG. 1B, the version management system 150 includes a code version control system 10, a bug management system 20, an agent system 30, and a storage device 40. The storage device 40 is connected to the code version control system 10, the bug management system 20, and the agent system 30 in a wired or wireless manner. The storage device 40 can be implemented by a read-only memory, a flash memory, a floppy disk, a hard disk, a compact disk, a flash drive, a magnetic tape, a network accessible database, or a storage medium having the same function by those skilled in the art.

In one embodiment, the version management method 200 can be implemented by the elements shown in FIG. 1A or FIG. 1B. The version management method 200 is capable of acting as an engineer agent to perform state maintenance of the bug management system 20, so that after the engineer adopts the issue, the issue state of the bug management system 20 is automatically updated and a branch corresponding to the bug information in the code version control system 10 is automatically generated. After the solution is confirmed, the solution is merged into the master branch, and the status in the bug management system 20 is updated accordingly. The steps of the version management method 200 are described in more detail below.

In step 210, the code version control system 10 selects a master branch.

In one embodiment, the code version control system 10 can control the software according to the branch(s) to perform version control and select a branch as the master branch. The branches are created by a version of code or software. After creating the branches of multiple versions, each branch can be modified independently.

As shown in FIG. 1C, the branches (e.g., branches b1, b2) form a tree structure, with master branch mb being the initial source. Moreover, the master branch mb is a branch that has no branch of the parent branch. In FIG. 1C, the timing is performed from top to bottom and is expected to release the solution when the release time TL arrives. In addition, each node n0~n10 represents a code of all or a part of the software. For example, the master branch mb includes nodes n0, n1, n5, and n6, each representing a complete software version of the corresponding time. For example, the branch b1 includes nodes n7 to n8. For another example, the nodes n2 to n4 on the branch b2 each represent a modified version of a certain code. The final version of this code modification is node n4. When the code of the node n4 is compiled and the executable file is generated, this means that this section code can be merged into the candidate branch cb. The candidate branch cb includes nodes n9 to n10. The relevant content of the candidate branch cb will be described in detail later.

In step 220, the bug management system 20 receives bug information.

In one embodiment, the bug information can be input to the bug management system 20 by a verifier. Or, the bug information can be automatically imported into the bug management system 20 by a test system.

Figure 4:
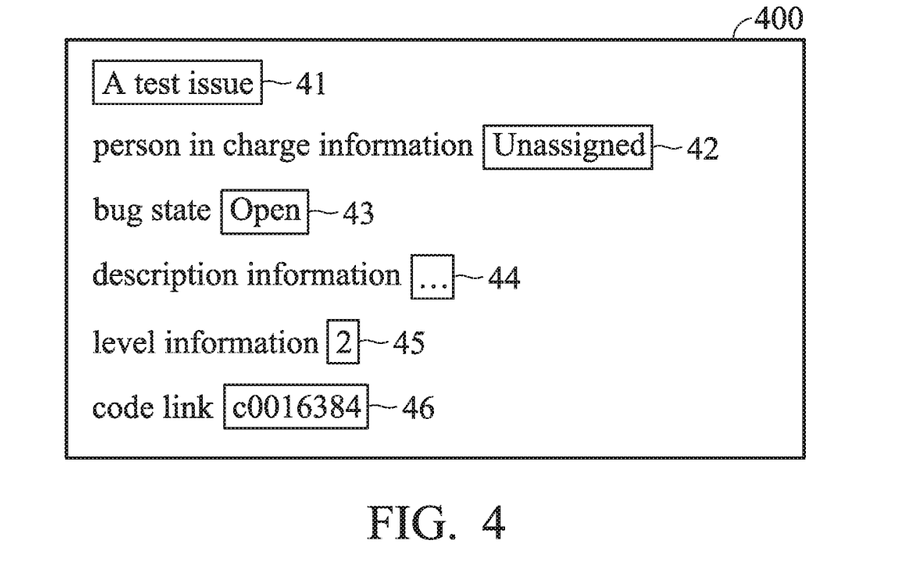
FIG. 4 is a schematic diagram of an interface of the bug management system in accordance with one embodiment of the present disclosure.

In one embodiment, please refer to FIG. 4, FIG. 4 is a schematic diagram of an interface 400 of the bug management system 20 in accordance with one embodiment of the present disclosure. The interface 400 is used to display information about at least one bug. In one embodiment, the interface 400 displays a bug name 41 as "A test issue". The bug information includes at least one bug state 43. Moreover, the bug state 43 is initially set to an open state "Open".

In one embodiment, the bug information further includes the person-in-charge information 42 (including the assigned person message). Moreover, the person-in-charge information 42 is initially set to "Unassigned". The bug management system 20 can read the name of the person in charge corresponding to the bug information from the storage device 40 or manually input the name of the person in charge.

In one embodiment, the bug information further includes description information 44 (for example, further description of the bug), level information 45 (for example, 2, the smaller the value, the more the priority needs to be processed, and the rule of the value can be defined in advance), bug number, bug ID, and/or code link 46. The content of the code link 46 in FIG. 4 is the code link "c0016384" (which can also be implemented by hyperlink). In one embodiment, the user can click on the content of the code link 46 to read the code corresponding to the bug.

In one embodiment, the bug management system 20 obtains the code corresponding to the bug from the storage device 40 via the code link 46. The code corresponding to the bug is, for example, a code segment in which an error has occurred. In one embodiment, the person in charge can select the code link 46 through the bug management system 20 to show the code of the bug linked to the code link 46. The code of the bug can be displayed through an interface.

Figure 5:
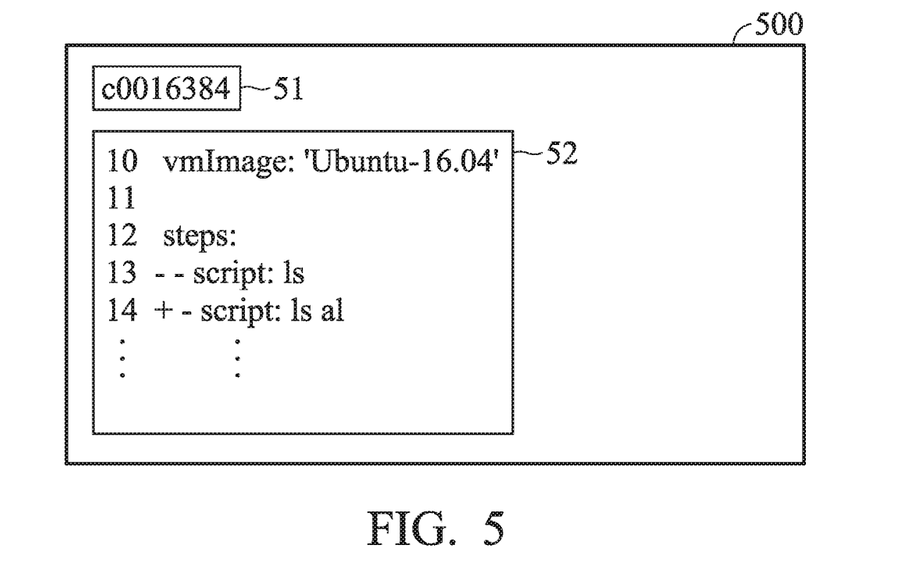
FIG. 5 is a schematic diagram of an interface of a code link in accordance with one embodiment of the present disclosure.

Please refer to FIG. 5, FIG. 5 is a schematic diagram of an interface 500 of a code link 46 in accordance with one embodiment of the present disclosure. The code link 51 in the interface 500 is displayed as "c0016384". In one embodiment, the bug management system 20 obtains the original code 52 corresponding to the bug from the storage device 40 in accordance with the code link 46 in FIG. 4.

In step 230, the agent system 30 sets the bug state 43 to a working state after it receives a confirmation assignment message corresponding to the bug information.

In one embodiment, after receiving the bug information, the bug management system 20 transmits an assigned person message to the agent system 30. The agent system 30 transmits a query message to a user device corresponding to the assigned person message. When the user device returning the confirmation assignment message to the agent system 30, the agent system 30 sets the bug state 43 to the working state.

For example, after receiving the bug information, the bug management system 20 can transmit a query message to a user device (for example, a mobile phone) of a corresponding person in charge (for example, "Jack") by using an email, a webpage, or another transceiver system. The person in charge can reply or press the confirmation assignment button to transmit a confirmation assignment message to the agent system 30. This process represents the person in charge confirming that he/she will provide a corresponding solution for the bug.

Figure 6:
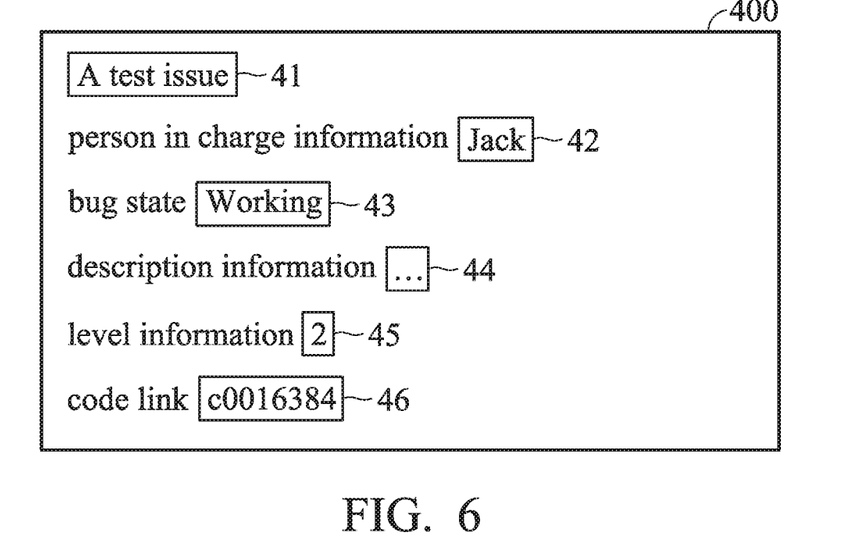
FIG. 6 is a schematic diagram of an interface of the bug management system in accordance with one embodiment of the present disclosure.

In one embodiment, please refer to FIG. 6, FIG. 6 is a schematic diagram of an interface 600 of the bug management system 20 in accordance with one embodiment of the present disclosure. The difference between FIG. 6 and FIG. 4 is that the agent system 30 is configured to set the person-in-charge information 42 to "Jack" after receiving a confirmation assignment message. Moreover, the agent system 30 sets the bug state 43 to a working state "Working".

In step 240, in response to the agent system 30 setting the bug state to a working state, the agent system 30 controls the code version control system 10 to generate a branch (for example, branch b2) corresponding to the bug information based on the master branch mb.

In one embodiment, when the agent system 30 determines that a release time TL has been set, the agent system 30 controls the code version control system 10 to call a candidate branch cb.

More specifically, in response to the agent system 30 determining that the release time TL has been set, it indicates that the code version control system 10 has generated the candidate branch cb. Therefore, the agent system 30 sends a call message S1 (shown in FIG. 1C) via the communication link LK1. The call message S1 is used to trigger the code version control system 10 to call the candidate branch cb.

In one embodiment, the candidate branch cb is used to integrate the code of one or more solutions. For example, when the code of branch b2 and/or branch b1 is modified and verified (representing that the bug problem corresponding to branch b2 and/or branch b1 is resolved), the code version control system 10 merges the code of branch b2 and/or branch b1 into candidate branch cb.

For example, if the name of the bug information is A, the agent system 30 controls the code version control system 10 to generate a branch b1 corresponding to the bug A based on the master branch mb. For another example, if the name of the bug information is B, the agent system 30 controls the code version control system 10 to generate a branch b2 corresponding to the bug B based on the master branch mb.

In one embodiment, the agent system 30 triggers the code version control system 10 to generate a plurality of branches corresponding to the plurality of bug information based on the master branch mb. For example, the agent system 30 triggers the code version control system 10 to generate a branch b1 corresponding to the bug A based on the master branch mb and generate a branch b2 corresponding to the bug B.

In one embodiment, in addition to the single candidate branch cb, the processing of the bug itself can also generate a branch corresponding to the bug, and the "git" command is taken as an example. The command example is as follows.

git checkout -b b1 git checkout -b b2

The first bug can be corresponded to branch b1 and the second bug can be corresponded to b2. Each bug corresponds to its respective branch b1, b2, respectively, from which it can be seen that the solution of bugs is independent of each other.

In step 250, the code version control system 10 merges the modified and verified code of the branch (e.g., branch b2) to a candidate branch cb.

For example, suppose branch b2 is used to solve the problem of bug B. After the code of branch b2 is completely modified and verified (representing the problem of bug B corresponding to branch b2 is resolved), the code version control system 10 merges the code on branch b2 into candidate branch cb.

Figure 7:
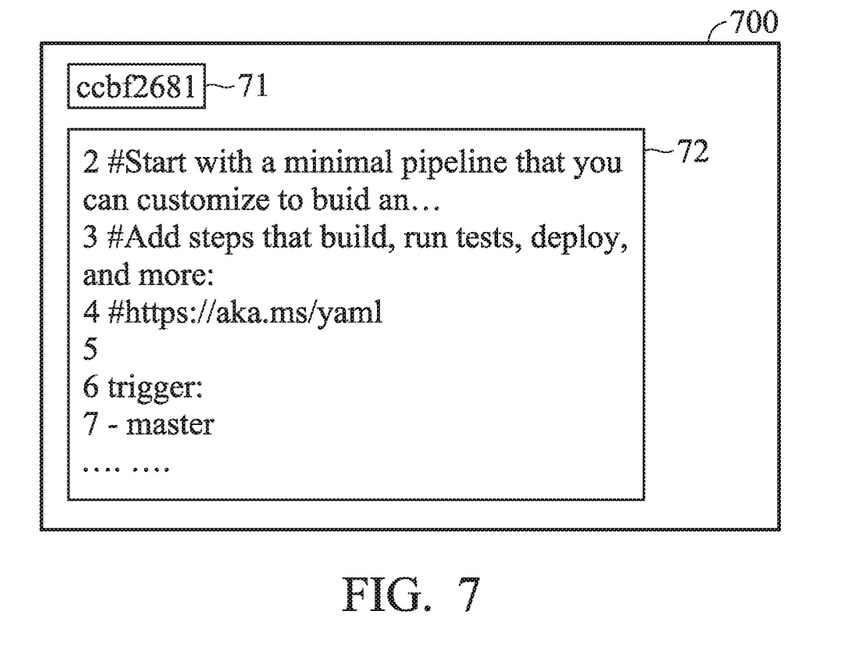
FIG. 7 is a schematic diagram of an interface of code on branch in accordance with one embodiment of the present disclosure.

In one embodiment, reference is made to FIG. 7. FIG. 7 is a schematic diagram of an interface 700 of code 72 on branch b2 in accordance with one embodiment of the present disclosure. The content of the code link 71 in FIG. 7 is the code link "ccbf2681". The engineer can create a full prepared solution for release by modifying the code 72 on branch b2, so as to deal with problems caused by the bug (such as bug B corresponding to branch b2).

More specifically, the modified and verified code 72 is represented by node n4. After the modified and verified code 72 is merged into the candidate branch cb, the resulting candidate branch represents a software solution ready to be released.

After the code 72 on branch b2 is completely modified and verified (representing the problem of bug B corresponding to branch b2 is resolved), the code version control system 10 merges code 72 on branch b2 into candidate branch cb to generate node n10 of the candidate branch (represented by the node n10, the node n10 of the candidate branch can be considered as a new version of the solution for solving the corresponding bug).

Since the modification of the code is performed on the branch (for example, branch b2), if there is a problem with the modification, it will not affect the behavior of the program before creating the branch. In addition, after the solution is verified, the code version control system 10 can combine this solution (e.g., the code for this solution is defined as b2bugB, which represents the solution of branch b2 corresponding to bug B.) into the candidate branch cb. This combined operation can also be performed by the agent system 30. The merge method takes the "git" command as an example. The command example is as follows.

git checkout candidate_branch git merge b2bugB

The code version control system 10 or the agent system 30 firstly calls the candidate branch cb (represented by candidate_branch), and secondly merges this solution (represented by b2bugB) into the candidate branch cb.

In one embodiment, the solution (represented by b2bugB) is incorporated into the candidate branch cb by directly overwriting or modifying the code in the original candidate branch cb to be regarded as a new version of the solution. Therefore, the code of the candidate branch cb at this time is represented by "candidate_branch". Thereafter, when the release time TL arrives, the candidate branch cb can be merged with the master branch mb.

In one embodiment, the code version control system 10 verifies that the candidate branch cb can solve the problem of the bug by verifying, testing, and/or executing the candidate branch cb.

In one embodiment, when the candidate branch cb fails to pass the verification, the code version control system 10 removes the code of the branch (e.g., branch b2) from the candidate branch cb.

By combining one or more solutions, one or more of the corresponding solutions for the bugs can be integrated to better control the software version of the project. At the same time, it also saves the time cost of each verifier when they perform the regression test.

In step 260, the agent system 30 controls the code version control system 10 to merge the candidate branch to the master branch mb when the release time TL arrives, and the agent system 30 sets the bug state to a verification state.

Figure 8:
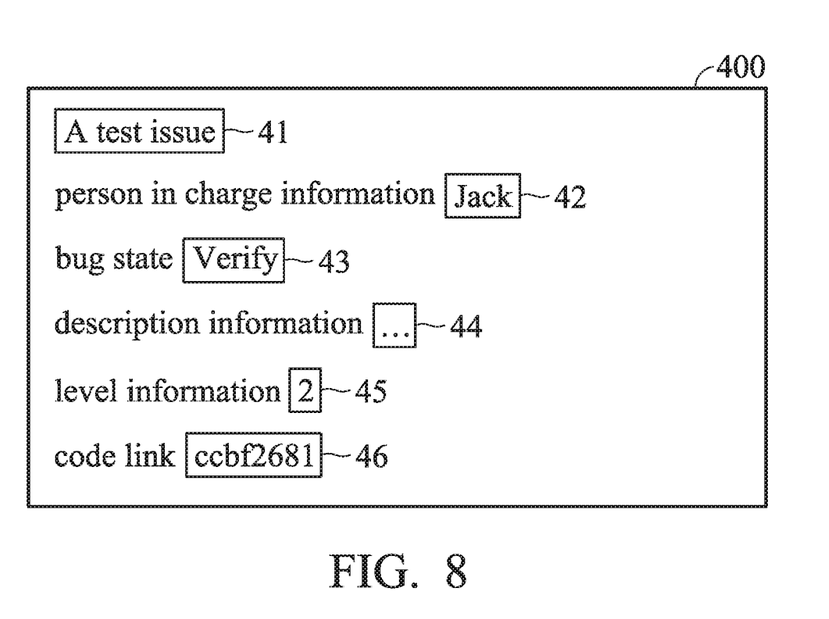
FIG. 8 is a schematic diagram of an interface of the bug management system in accordance with one embodiment of the present disclosure.

In one embodiment, please refer to FIG. 8. FIG. 8 is a schematic diagram of an interface 400 of the bug management system 20 in accordance with one embodiment of the present disclosure. The difference between FIG. 8 and FIG. 6 is that when the release time TL arrives, the agent system 30 controls the code version control system 10 to merge the new candidate branch into the master branch mb. The agent system 30 sets the bug state to the verification state "Verify", and the content of the merged code link 46 after step 260 is set to "ccbf2681". The code link 46 can correspond to the new bug number, and after the new candidate branch is merged into the master branch mb, a new code number is generated for the new master branch.

In one embodiment, when the release time TL arrives, the agent system 30 controls the code version control system 10 to merge the candidate branch cb into the master branch mb. The merge method takes the "git" command as an example. The command example is:

git checkout master git merge candidate_branch

The code "master" stands for the master branch mb. The code version control system 10 firstly calls the master branch mb, and secondly merges the candidate branch cb (represented by "candidate_branch") into the master branch mb.

In one embodiment, after the agent system 30 triggers the code version control system 10 to merge the candidate branch cb into the master branch mb, the agent system 30 treats the code of the merged master branch mb as a new version master branch (represented by node n5). The code of the new version master branch is stored in the storage device 40, and a code link 46 is generated corresponding to the new version master branch. On the other hand, the bug management system 20 can also obtain the code of the new version master branch from the storage device 40 via the code link 46.

In one embodiment, when the candidate branch cb passes the verification, the agent system 30 triggers the code version control system 10 to merge the candidate branch cb to the master branch mb in response to the release time TL arriving. After the code version control system 10 completes the merge, a completion message S2 (shown in FIG. 1C) is transmitted through the communication link LK1 to notify the agent system 30 that the merge has been completed. After receiving the completion message S2, the agent system 30 automatically sets the bug state in the bug management system 20 to the verification state "Verify" via the communication link LK2.

In the example of FIG. 1C, when the software release time TL has arrived, the candidate branch cb (i.e., the modified and verified candidate branch cb, represented by node n10) must be merged with the master branch mb. In this example, the candidate branch cb merges only branch b2 (the node n4 represents the correctly verified code of branch b2, and the content of node n4 is merged to node n10 before the release time TL has arrived. Then, when the release time TL has arrived, the content of the node n10 is merged with the content of the master branch mb, represented by node n5, to generate a new version master branch). Because the branch b1 may not have a solution, or the publishing time is postponed for some reason and cannot be merged into the candidate branch cb before the release time TL has arrived, so that the bug A corresponding to the branch b1 has no solution in this new version master branch. For the unbundled branch b1, if there is a solution in the future, when a newly candidate branch is created, it can be merged to the newly candidate branch at an appropriate time.

Figure 3:
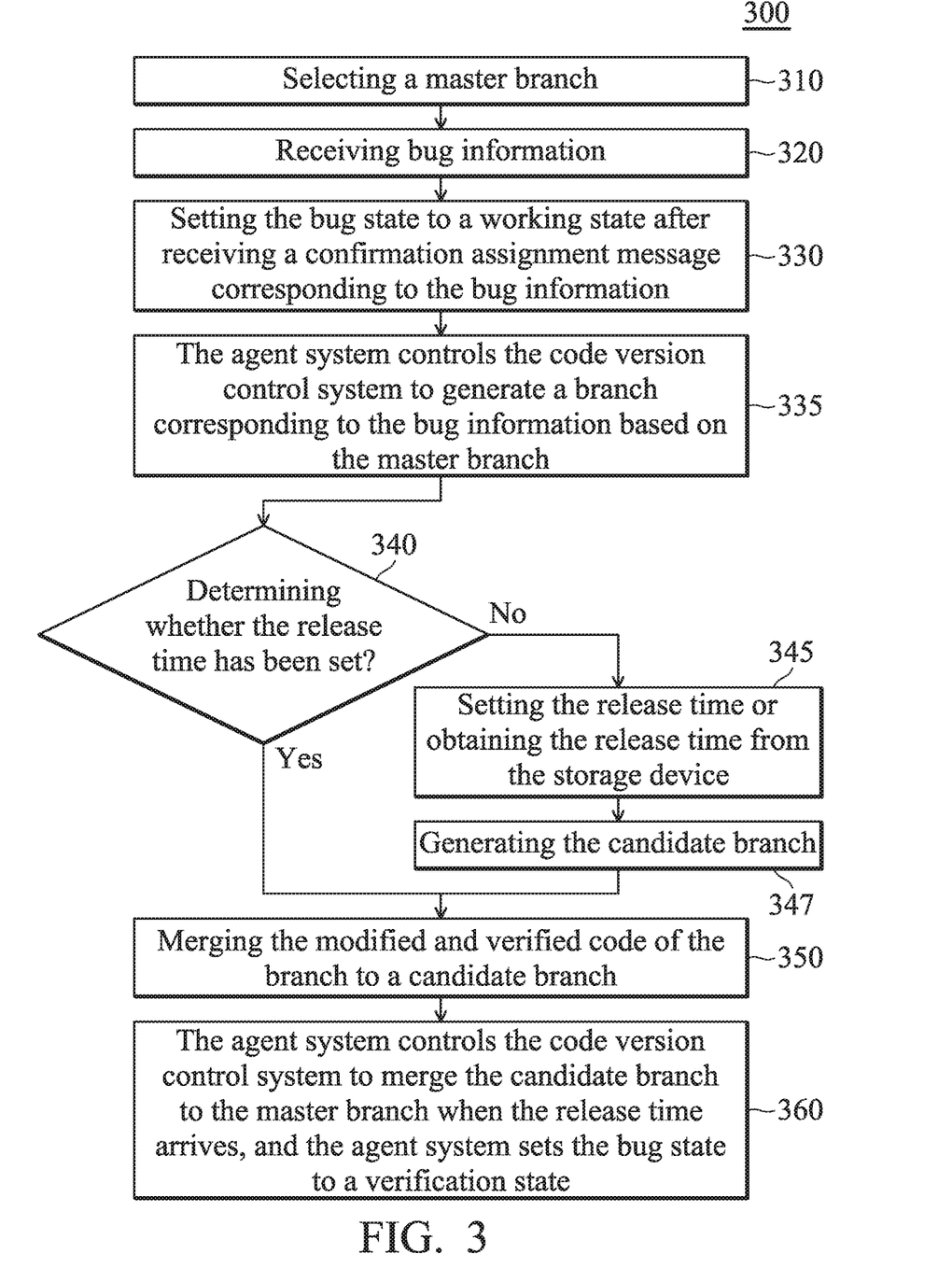
FIG. 3 is a flowchart of a version management method in accordance with one embodiment of the present disclosure.

In one embodiment, please refer to FIG. 3, FIG. 3 is a flowchart of a version management method 300 in accordance with one embodiment of the present disclosure. The steps 310 to 330 and 350 to 360 of FIG. 3 are the same as the steps 210 to 230 and 250 to 260 of FIG. 2, respectively, and therefore will not be described again. The difference between FIG. 3 and FIG. 2 is that the steps 335 to 347 further determine whether the release time TL has been set and its corresponding operation.

In step 335, the agent system 30 controls the code version control system 10 to generate a branch (for example, branch b2) corresponding to the bug information based on the master branch mb.

In step 340, the agent system 30 determines whether the release time TL has been set. If the agent system 30 determines that the release time TL has been set, it then performs step 350. If the agent system 30 determines that the release time TL has not been set, it then performs step 345.

In one embodiment, the agent system 30 can determine whether the release time TL has been set by searching for a column in the bug management system 20 regarding the release time TL.

In step 345, the agent system 30 sets the release time TL or obtains the release time TL from the storage device 40. The agent system 30 can set the release time TL according to a preset value or a value input by the user.

In step 347, the agent system 30 controls the code version control system 10 to generate the candidate branch cb.

In one embodiment, the code version control system 10 can generate the candidate branch cb by means of a command. Take the "git" command as an example. The command example is:

git checkout -b candidate_branch

Thereby, the code version control system 10 can generate the candidate branch cb according to the command. It should be understood by those of ordinary skill in the art that the case is exemplified by the "git" command, and is not limited thereto. For example, the "SVN" command can also be used.

The version management system, the version management method, and the non-transitory computer-readable medium shown in the embodiment of the present invention, wherein the code version control system and the bug management system can be connected through the agent system. The engineer (or the person in charge of the bug) can complete the bug status update of the bug management system by simply interacting with the agent system, and establish branching, debugging, and providing a corresponding solution. Since the bug management system is connected to the solution, the solution can be stored in the storage device. The engineer (or the person in charge of the bug) can obtain the corresponding executable software or complete code from the storage device by clicking the code link of the corresponding solution. Since the problem itself is also a result measured based on a solution, the software code of the reproducible problem can also be obtained by the agent system querying the storage device to look up the reference table. In addition, once the assigned engineer (or the person in charge of the bug) accepts to handle the bug, the agent system can automatically update the bug status of the corresponding problem on the bug management system and automatically generate one or more code branches corresponding to the bug for the engineer (or the person in charge of the bug) to debug and modify the source code. Furthermore, the agent system can control the code version control system to create a candidate branch for finding the solution according to the expected correction date (software release time) set by the bug management system. The candidate branch can be combined with one or more solution code. In this way, the solution corresponding to one or more bugs is integrated, so that the software version of the project can be better controlled, and the cost of regression testing of each tester is also saved. The code on the branch can be merged into the candidate branch once the corresponding solution is confirmed. When the release time arrives, the candidate branch is merged into the master branch, and the status in the bug management system is immediately updated by the agent system. This reduces the possibility of human error and increases the efficiency of software version control.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A version management system, comprising:
   a code version control system, configured to select a master branch, wherein the master branch is a branch that has no branch of a parent branch;
   a bug management system, configured to receive bug information, wherein the bug information includes a bug state; and
   an agent system, configured to set the bug state to a working state after receiving a confirmation assignment message corresponding to the bug information;
   wherein in response to the agent system setting the bug state to the working state, the agent system controls the code version control system to generate a branch of a code corresponding to the bug information based on the master branch, and the code version control system merges modified code of the branch to a candidate branch;

wherein in response to the release time arriving, the agent system controls the code version control system to merge the candidate branch to the master branch, and the agent system sets the bug state to a verification state, wherein in response to the agent system determining that the release time has not been set, the agent system sets a release time or obtains the release time from a storage device, and controls the code version control system to generate the candidate branch, wherein the candidate branch finds a solution according to expected software release time set by a bug management system, wherein in response to the agent system determining that the release time has been set, the candidate branch is generated on behalf of the code version control system.

2. The version management system of claim 1, wherein after the agent system controls the code version control system to merge the candidate branch to the master branch, the agent system treats merged code of the master branch as a new version master branch, the agent system stores the code of the new version master branch in a storage device and generates a code link corresponding to the new version master branch, and the bug management system obtains the code of the new version master branch from the storage device through the code link.

3. The version management system of claim 1, wherein after receiving the bug information, the bug management system transmits an assigned person message to the agent system, the agent system transmits a query message to a user device corresponding to the assigned person message, and in response to the user device returning the confirmation assignment message to the agent system, the agent system sets the bug state to the working state.

4. The version management system of claim 1, wherein in response to the code version control system merging the modified code of the branch to the candidate branch, the code version control system verifies the candidate branch; and wherein in response to the candidate branch passing a verification and the release time arrives, the agent system controls the code version control system to merge the candidate branch to the master branch, and the agent system sets the bug state to the verification state.

5. The version management system of claim 4, wherein in response to the candidate branch failing to pass the verification, the code version control system removes code of the branch from the candidate branch.

6. A version management method, comprising:
selecting a master branch, wherein the master branch is a branch that has no branch of a parent branch;
receiving bug information, wherein the bug information includes a bug state;
setting the bug state to a working state after receiving a confirmation assignment message corresponding to the bug information;
in response to setting the bug state to the working state, generating a branch of a code corresponding to the bug information based on the master branch, and merging modified code of the branch to a candidate branch;
in response to a release time arriving, merging the candidate branch to the master branch, and setting the bug state to a verification state, in response to determining that the release time has not been set, setting the release time or obtaining the release time from a storage device, and generating a candidate branch, wherein the candidate branch finds a solution according to expected software release time set by a bug management system; and in response to determining that the release time has been set, indicating that the candidate branch has been generated.

7. The version management method of claim 6, after merging the candidate branch to the master branch, further comprising:
treating merged code of the master branch as a new version master branch;
storing the code of the new version master branch in a storage device;
generating a code link corresponding to the new version master branch; and
obtaining the code of the new version master branch from the storage device through the code link.

8. The version management method of claim 6, after receiving the bug information, further comprising:
transmitting an assigned person message;
transmitting a query message to a user device corresponding to the assigned person message; and
receiving the confirmation assignment message from the user device, and setting the bug state to the working state.

9. The version management method of claim 6, further comprising:
verifying the candidate branch; and
in response to the candidate branch passing a verification and arrival of the release time, merging the candidate branch to the master branch, and setting the bug state to the verification state.

10. The version management method of claim 9, further comprising:
in response to the candidate branch failing to pass the verification, removing code of the branch from the candidate branch.

11. A non-transitory computer-readable medium for storing one or more computer programs including a plurality of instructions, having computer-executive instructions stored thereon that, when executed by a processor, cause a computer to implement a version management method, the method comprising:
receiving bug information, wherein the bug information includes a bug state;
setting the bug state to a working state after receiving a confirmation assignment message corresponding to the bug information;
in response to setting the bug state to the working state, generating a branch corresponding to the bug information based on a master branch, wherein the master branch is a branch that has no branch of a parent branch, and merging modified code of the branch to a candidate branch;
in response to a release time arriving, merging the candidate branch to the master branch, and setting the bug state to a verification state,
in response to determining that the release time has not been set, setting the release time or obtaining the release time from a storage device, and generating a candidate branch, wherein the candidate branch finds a solution according to expected software release time set by a bug management system; and in response to determining that the release time has been set, indicating that the candidate branch has been generated.

12. The non-transitory computer-readable medium of claim 11, wherein the method further comprises the following steps:
   transmitting an assigned person message;
   transmitting a query message to a user device corresponding to the assigned person message; and
   receiving the confirmation assignment message from the user device, and setting the bug state to the working state.

13. The non-transitory computer-readable medium of claim 11, wherein the method further comprises the following steps:
   verifying the candidate branch; and
   in response to the candidate branch passing a verification and arrival of the release time, merging the candidate branch to the master branch, and setting the bug state to the verification state.

14. The non-transitory computer-readable medium of claim 13, wherein the method further comprises the following steps:
   in response to the candidate branch failing to pass the verification, removing code of the branch from the candidate branch.

15. The non-transitory computer-readable medium of claim 11, wherein the method further comprises the following steps:
   treating merged code of the master branch as a new version master branch;
   storing the code of the new version master branch in a storage device;
   generating a code link corresponding to the new version master branch; and
   obtaining the code of the new version master branch from the storage device through the code link.

* * * * *